United States Patent [19]

Baird

[11] Patent Number: 4,829,304

[45] Date of Patent: May 9, 1989

[54] MAP-AIDED NAVIGATION SYSTEM EMPLOYING TERCOM-SITAN SIGNAL PROCESSING

[75] Inventor: Charles A. Baird, Melbourne Beach, Fla.

[73] Assignee: Harris Corp., Melbourne, Fla.

[21] Appl. No.: 864,843

[22] Filed: May 20, 1986

[51] Int. Cl.$^4$ .............................................. G06F 15/50
[52] U.S. Cl. ...................................... 342/63; 364/449
[58] Field of Search ............... 364/433, 443, 449, 460, 364/423; 342/63-65

[56] References Cited

U.S. PATENT DOCUMENTS 4,144,571 3/1979 Webber ................................. 342/64
4,584,646 4/1986 Chan et al. .......................... 364/443

OTHER PUBLICATIONS

L. D. Hostetter et al.; "Nonlinear Kalman Filtering Techniques for Terrain-Aided Navigation"; IEEE Trans on Automatic Control; vol. AC-28 Mar. 83.

"Continuous Kalman Updating . . . "; R. D. Andreas et al.; Sandia National Laboratories, pp. 1263-1270, *IEEE* 1978.

"An Alternative Approach for Terrain Aided . . . "; T. C. Sheives et al.; Sandia National Laboratories, New Mexico, Dec. 1979.

"Application of Multiple Model Estimation . . . "; W. Tang et al.; pp. 757-764; *IEEE;* 1981.

*Primary Examiner*—Thomas H. Tarcza
*Assistant Examiner*—Tod Ray Swann
*Attorney, Agent, or Firm*—Antonelli, Terry & Wands

[57] ABSTRACT

A navigation system contains a modified Kalman filter processor which continuously receives both TERCOM and SITAN control information so that the operation of the SITAN processing is effectively continuously optimized. The system employs an over flight terrain data storage map to which position and altitude signals are coupled for extracting both elevation and slope information from the stored map. The extracted elevation and slope data are coupled, together with the outputs of baromatic and radar altimeter sensors and estimated altitude and position data outputs from the navigation unit, to a correlation/modified Kalman filter processor. Elevation profile data accessed from the map is correlated with elevation profile signals derived from aircraft on-board sensors, in order to find that flight path on the stored map, parallel to, but displaced from the flight path indicated by the navigation unit, for which successive elevation data values correspond most closely to the elevations measured by the altimeter sensors. In this correlation processing operation the "most likely" path is selected by defining a performance index associated with each path and selecting that path with the best performance index. The result of the correlation processing provides a position fix to be combined with the position estimates in the modified Kalman filter.

24 Claims, 1 Drawing Sheet

MAP-AIDED NAVIGATION SYSTEM EMPLOYING TERCOM-SITAN SIGNAL PROCESSING

FIELD OF THE INVENTION

The present invention relates to navigation systems and is particularly directed to an airborne navigation system that effectively combines continuously updated elevation data and slope data derived from a digital terrain elevation map, for providing an accurate determination of the geographic position of a vehicle.

BACKGROUND OF THE INVENTION

Airborne vehicle nap-of-the-earth (NOE) flight requires precise pilot control to avoid obstacles and elevated terrain. While the pilot normally relies on good visibility to perform the NOE function, requirements exist for NOE flight during periods of less than good visibility (poor weather or night time conditions) and (pilotless) automatic guidance vehicles. Airborne navigation systems are typically of the dead reckoning (DR) variety, usually based upon doppler radar and compass systems; while these navigation schemes offer excellent short term guidance capability, they exhibit unacceptable long term position error growth, so that an in-flight correction procedure, such as periodic position updating of the dead reckoning navigation system, is necessary. Unfortunately, currently available radio aids (even assuming their presence in the vehicle's operational area) are generally insufficient to support NOE flight conditions where line-of-sight communications are not possible.

A proposal to solve this problem has been the concept of employing terrain correlation techniques through which the position of the aircraft as determined by its navigation system is updated as a function of the overflown terrain, its elevation heights and height variations. Examples of such correlation schemes include Terrain Contour Matching (TERCOM) which relies on elevation profile correlations and Sandia Inertial Terrain Aided Navigation (SITAN) which employs slope information to accomplish vehicle navigation. (For a discussion of navigation systems, including TERCOM and SITAN navigation schemes, attention may be directed to articles entitled "Continuous Kalman Updating of an Inertial Navigation System Using Terrain Measurements" by R. D. Andreas et al, Sandia National Laboratories pp. 1263–1270, IEEE 1978; "An Alternative Approach for Terrain-Aided Navigation Using Parallel Extended Kalman Filters" by T. C. Sheives et al, Sandia National Laboratories, Albuquerque, N.M., December 1979; and "Application of Multiple Model Estimation Techniques to a Recursive Terrain Height Correlation System" by W. Tang et al, pp. 757–764, IEEE 1981 and the U.S. Pat. Nos. to Evans et al 4,179,693; Webber 4,144,571; Thomas et al 4,103,847; Blatchford 3,992,613; Rawicz 4,320,287; Keearns 4,495,580; Sakaki et al 4,472,812; Fleishman 4,232,313; Graupe et al 4,185,168; Broniwitz et al 3,952,304; and Giles et al., 4,511,219; and the British patent to Fryen et al GB No. 2025723A.)

Within the above-referenced approaches the parallel filter system described in the Andreas et al article incorporates both TERCOM and SITAN signal processing mechanisms in an effort to improve upon navigation performance. In this system the basic navigation tool is the SITAN processor which requires that position information satisfy specific accuracy limitations. For this purpose an error decision algorithm is employed to monitor the error in the SITAN processor. When this error, which is expected to and permitted to expand, particularly during flight over monotonous terrain (e.g. water), reaches a prescribed magnitude, an attendant TERCOM signal processor (typically referenced as parallel filters) is engaged to update or correct the position information upon which the SITAN processor relies, thereby reducing the error and allowing the SITAN processing algorithm to proceed. In other words, the combined TERCOM-SITAN parallel filter scheme of Andreas et al is essentially a SITAN mechanism in which an adjunct TERCOM processor is engaged only when an error decision mechanism detects that the error in the SITAN processor is unacceptable. One undesirable aspect of this approach is the fact that the navigation mechanism effectively oscillates-it starts on course, is permitted to stray and is then pulled back and restarted. The resulting guidance of the aircraft generates a flight path that is a zig-zag route, on and off the intended flight path.

In addition, because the parallel filter SITAN-TERCOM scheme requires an error monitoring algorithm to determine if and when the TERCOM processor is to be engaged, it is computationally complex and inefficient.

SUMMARY OF THE INVENTION

In accordance with the present invention, there is provided a new and improved navigation system which, similar to the parallel filter scheme of Andreas et al, employs both TERCOM and SITAN signal processing, but does so in a manner which is computationally efficient, not requiring an error decision logic operator to control the selective engagement of the TERCOM correction algorithm, as in the parallel filter approach. Rather than employ a TERCOM processor as an occasionally accessed adjunct to the elevation correlation and slope aided navigation mechanism of SITAN signal processing, the present invention executes TERCOM processing as a continuously repeated elevation data updating operator, without depending upon a separate decision logic function. As such, a modified Kalman filter processor continuously receives both TERCOM and SITAN control information so that the operation of the SITAN processor is effectively continuously optimized. In an exemplary configuration the navigation system of the present invention employs an over flight terrain data storage medium to which position and altitude signals derived from a suitable navigation unit (such as doppler velocity sensor or inertial sensor) are coupled for extracting both elevation and slope information from the stored map. The extracted elevation and slope data read out of the digital map generator are coupled, together with the outputs of barometric and radar altimeter sensors and estimated altitude and position data outputs from the navigation unit, to a correlation/modified Kalman filter processor.

In the elevation correlation portion of the processor elevation profile data accessed from the digital map generator is correlated with elevation profile signals derived from the aircraft's on-board sensors, in order to find that flight path on the stored map, parallel to, but displaced from, the flight path indicated by the navigation unit, for which successive elevation data values correspond most closely to the elevations measured by the altimeter sensors. In this correlation processing operation the "most likely" path is selected by defining a performance index associated with each path and selecting that path with the best performance index. The performance index may be optimized, for example, by maximization of the correlation of the map and altimeter elevation profiles, by minimization of the mean square difference between the two profiles or by minimization of the mean absolute difference between the two profiles. The result of the correlation processing (which effectively corresponds to the TERCOM processing function) provides a position fix to be combined with the position estimates in a modified Kalman filter.

The Kalman filter processing performs two functions. First of all, it provides for the effective combination of the position fixes from the correlation processor and the estimate of position from the navigator unit. In this operation the filter may also integrate the output of the barometric altimeter and the vertical channel of navigation unit. Secondly, the filter combines slope information accessed from the digital map, the altitude estimate from the navigation unit (or barometric reference), and terrain clearance data from the radar altimeter to provide position updates. The filter updates the position estimate as a function of the product of a three-dimensional vector of Kalman gains, incorporating the filter's estimate of the error covariance matrix prior to updating, a linearized clearance measurement vector and an estimate of a clearance measurement error variance, and the difference between measured terrain clearance from the radar altimeter and estimated clearance based upon map indicated elevation.

DETAILED DESCRIPTION

Figure 1:
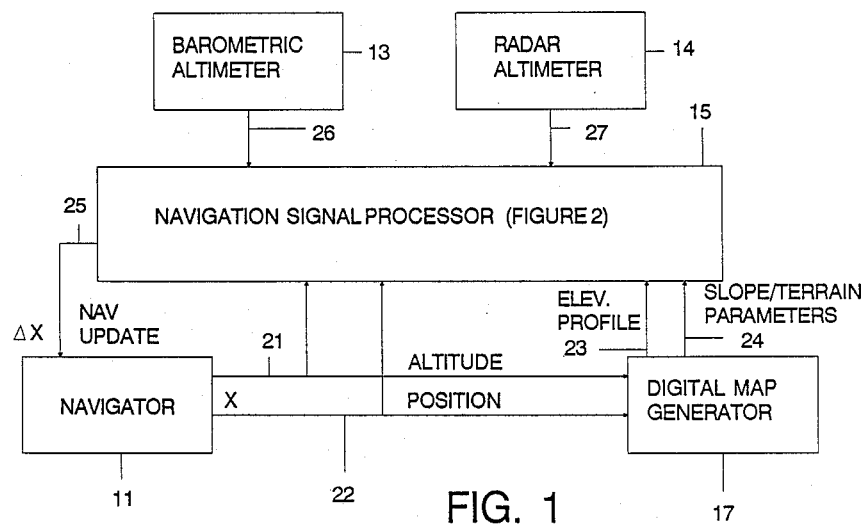
FIG. 1 is a block diagram of the combined TERCOM/SITAN navigation system according to the present invention.

Referring now to FIG. 1 of the drawings, there is illustrated a block diagram of a map-aided navigation system employing elevation profile correlation and slope-aided Kalman filter processing in accordance with the present invention. As shown in FIG. 1, the navigation hardware includes a navigator 11, a digital map generator 12, barometric and radar altimeters 13 and 14, respectively, and a navigation signal processor 15. Navigator unit 11 may be a conventional INS or doppler velocity unit and supplies altitude ($X_{altitude}$) and position data ($X_{North}$ and $X_{East}$) over links 21 and 22 for in-flight aircraft guidance control. Links 21 and 22 are coupled to navigation signal processor 15 and to digital map generator 12. Correction signals from navigation signal processor 15 are coupled over link 25 for updating the altitude and position representative signals generated by navigation unit 11. Digital map generator 12 may be of the type described in copending U.S. patent application Ser. No. 641,179 filed Aug. 15, 1984 which is a continuation of U.S. patent application Ser. No. 224,742 filed Jan. 13, 1981 by Paul Beckwith et al entitled "Digital Map Generator and Display System" and assigned to the Assignee of the present application. The hardware of the digital map generator described in that application supplies elevation profile data over link 23 and slope and terrain parameter data over link 24 to navigation signal processor 15, in response to the altitude and position data supplied from navigator unit 11 over links 21 and 22, respectively.

Figure 2:
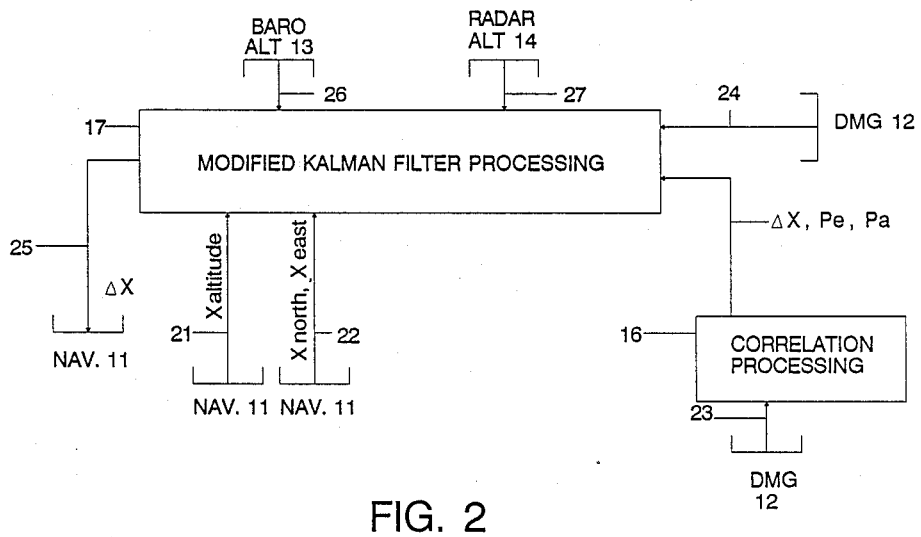
FIG. 2 shows the module execution sequence of navigation signal processor 15 of the system shown in FIG. 1.

Navigation signal processor 15 preferably comprises a commercially available microprocessor and associated memory for execution of each of the elevation profile correlation and Kalman filter processing functions (which employ the position fix data derived from the correlation). For this purpose, navigation signal processor 15 also receives barometric altimeter and radar altimeter data over links 26 and 27 to be combined with the elevation profile and slope data in the execution of elevation profile correlation and Kalman filter processing, as will be described in detail below. Each of these signal processing functions is shown in FIG. 2 as a separate signal processing module the execution of which within navigation signal processor 15 will now be described.

As pointed out previously, the navigation signal process according to the present invention executes TERCOM signal processing on a repetitive deterministic basis, so as to effectively continuously update position reference data through which the SITAN processing is executed. For this purpose the elevation profile correlation processing module 16 is executed. The principal function of correlation processing module 16 is to locate that path within the digital terrain map stored in digital map generator 12, parallel to the effective flight path produced by navigator unit 11 (as represented by the altitude and position data on links 21 and 22) and displaced a distance $j\delta x$, where $j=0,1,2 \ldots N$ number of paths, whose elevations $e_m(i, j\delta x)$, where $i=0,1,2, \ldots m$, correspond most closely (produce the highest correlation) to the elevations $e_a(i)$ (altitude differential $\Delta_a$) measured by altimeters 13 and 14. For this purpose the data on links 26 (or 21) and 27 from barometric altimeter 13 (or navigator 11) and radar altimeter 14 are subtracted from one another to produce the altimeter measurement differential $\Delta_a$ corresponding to elevation data $e_a$.

The elevation profile data $e_m$ is supplied over link 23 from digital map generator 12 in response to the navigation inuts on links 21 and 22. Using these elevation data $e_a$ and $e_m$, navigation signal processor 15 executes a prescribed correlation operation and then selects the most likely path by defining a performance index J associated with each path j and then choosing that path yielding the best performance index. For this purpose a number of performance indices, defined in terms of the correlation function COR ($j\delta x$) may be employed as module 16. For example, the performance index J may be defined in terms of a maximization of the correlation function (COR) as:

$$J_{COR}(j\delta x) = \frac{1}{L} \sum_{i=1}^{L} e_m(i,j\delta x) e_a(i) \quad (1)$$

or minimization of the mean square difference (MSD) as $$J_{MSD}(j\delta x) = \frac{1}{L} \sum_{i=1}^{L} (e_m(i,j\delta x) - e_a(i))^2 \quad (2)$$

where L is the number of data sample points related to the distance traveled $d_L$, sample spacings in seconds and velocity V as $d_L = V \, S \, L$. This distance $d_L$ is termed the integration length and can be expressed as the normalized quantity $B = d_L/\delta x_c$, where $\delta x_c$ is the terrain correlation length as provided by digital map generator 12. Typically, B=5.

An alternative and preferred performance index $J_{MAD}$ is defined by:

$$J_{MAD}(j\delta x) = 1/L \sum_{i=1}^{L} |e_m(i,j\delta x) - e_a(i)|, \quad (3)$$

where $|*|$ means absolute value

From the correlation performance index, position fix data $\Delta x_c$ and an estimate Pe of the error in that position fix data are derived. More particularly, the position fix data $\Delta x_c$ (which has a North component $\Delta x_c$ $_{North}$, and East component $\Delta x_c$ $_{East}$ and an altitude component $\Delta x_c$ $_{altitude}$) is selected from that value of $j\delta x$ for which the value $J_{MSD}$ (equation (2)) or $J_{MAD}$ (equation (3)) is a minimum ($J_{min}$). That is, $j_{min} \delta x$ defines the North ($\Delta x_c$ $_{North}$) and East ($\Delta x_c$ $_{East}$) components of $\Delta x_c$, while the average elevation error along that path defines the altitude component as:

$$\Delta x_{c \; altitude} = \frac{1}{L} \sum_{i=1}^{L} [e_m(i,j_{min}\delta x) - e_a(i)], \quad (4)$$

Also obtained from the data supplied by digital map generator 12 is the terrain power TP, defined as:

$$TP = 1/L \sum_{i=1}^{L} e_m^2(i,j_{min}\delta x) \quad (5)$$

and the signal-to-noise ratio (SNR), defined as $$SNR = TP/Jmin \quad (6)$$

The horizontal position measurement error estimate Pe is selected as a function of SNR. As one non-limitative example, a set of parametric expressions for Pe in terms of SNR may be defined as follows:
If SNR<1, then Pe=(400 meters)$^2$.
If $1 \leq SNR \leq 10$, then Pe=(200 meters)$^2$.
If SNR>10, then Pe=(100 meters)$^2$.

The altitude measurement error estimate Pa is defined by the map and altimetry accuracy, a typical value being (12 meters)$^2$. These data ($\Delta x_c$, Pe and Pa) are then coupled from elevation profile correlation module 16 to Kalman filter processing module 17. Module 17 also receives slope and terrain parameters from digital map generator 12 on link 24. Altimeter data from barometric and radar altimeters 13 and 14 are supplied to module 17 over links 26 and 27. Using these position and altitude estimates, as well as the position fix and slope/terrain parameter data, the Kalman filter processing module effectively derives position updates as follows. For a detailed discussion of Kalman filter processing attention may be directed, for example, to "Applied Optimal Estimation", by A. Gelb, MIT Press, 1974.

In accordance with conventional accepted Kalman filter terminology, module 17 computes three position parameter updates ($\Delta x_{North}$, $\Delta x_{East}$ and $\Delta x_{altitude}$) and couples these updates to navigator unit 11 via link 25. Module 17 also computes a three-by-three error covariance matrix $P_k$ associated with these three position parameter updates. Between successive position update times K and K+1, the error covariance growth is computed as:

$$P_{K+1} = P_K + Q \quad (7)$$

where Q models the error growth characteristic of navigator unit 11. The spacing of the update times (K, K+1) is selected so that the vehicle travels approximately 100 meters between updates.

In response to the position fix data $\Delta x_c$ and error estimates Pe and Pa supplied from correlation processing module 16 at time K, modified Kalman filter processing module 17 computes the conventional Kalman filter expression:

$$[\Delta x_{North}, \Delta x_{East}, \Delta x_{altitude}]^T = P_K H^T [\Delta x_c - x] \\ [HP_K H^T + \text{diag}(Pe, Pe, Pa)]^{-1} \quad (8)$$

where the measurement matrix H is simply the three-by-three identity matrix for this specific Kalman filter. The vector x in equation (8) contains the two position components and the altitude component coupled from navigation unit 11 over links 21 and 22. An alternative form for equation (8) can be computed using three equivalent scalar expressions as in common Kalman filtering practice. The standard Kalman filter error covariance expression is used to update $P_K$, namely $$P_K = P_K - P_K H^T H P_K [HP_K H^T + \text{diag}(Pe, Pe, Pa)]^{-1} \quad (9)$$

The values of parameters $\Delta x_{North}$, $\Delta x_{East}$, and $\Delta x_{altitude}$ derived from equation (8) are coupled over link 25 to navigator unit 11.

Via link 24 slope data (North slope $S_N$, and East slope $S_E$), elevation $e_e$ and modified variance $r_K$ are coupled from digital map generator 12 at time K. The covariance $r_K$ may be simply selected as the altitude measurement error estimate Pa, or it may be modified by the addition of fit error from the slope computation.

In the digital map generator 12, the terrain slope may be computed from the elevation data base using several conventional algorithms. For example, a plane surface may be fit to the terrain surface using a least squares approach, and the slopes of this plane in the North and East directions define a North slope $S_N$ and an East slope $S_E$. The size of this plane at iteration K is selected as a function of the error covariance estimate $P_K$, a typical size being 2.5 times the square root of the sum of the North and East error variance terms from $P_K$. An error $e_{fit}$ (defined as the sum of the squares of the elevation differentials between the plane surface the terrain surface at the elevation data base grid points) in this plane fit from the terrain surface can be used to augment the altitude measurement error estimate Pa, to form the modified measurement variance $r_K$, where $r_K = Pa + e_{fit}$. In response to these parameters, Kalman processing module 17 computes the expression:

$$[\Delta x_{North}, \Delta x_{East}, \Delta x_{altitude}]^T = G_K [C_K + \hat{C}_K] \quad (10)$$

and couples the computed position and altitude updates to navigator unit 11 over link 25. In equation (10) above, the Kalman gains $G_K$ are computed as:

$$G_K = P_K H_K^T / [H_K P_K H_K^T + r_K], \quad (11)$$

where $H_K = [-\text{North slope}, -\text{East slope}, 1]$ (12)

$C_K$ is the measured clearance supplied from radar altimeter 14 over link 27, and
$\tilde{C}_K$ = estimated clearance computed as
$\tilde{C}_K = x_{altitude} - e_e$.

The $x_{altitude}$ is a measured value derived by barometric altimeter 13 via link 26 or navigator unit 11 via link 21. At this time, Kalman filter processing module 17 computes the error covariance update $P_K$ as:

$$P_K = [I - G_K H_K] P_K \qquad (13)$$

It should be observed that the above explanation of the signal processing executed by processing module 17 is given as an example only and it not limitative of the invention. Other, more complex (high order) filters may be employed to model other navigator errors, e.g. doppler bias, velocity errors, INS tilt and accelerometer errors, etc. without departing from the basic processing scheme according to the present invention.

As will be appreciated from the foregoing description the present invention provides a navigation system which executes both TERCOM and SITAN signal processing on a continual basis, so as to be computationally efficient, not requiring an error decision logic operator to control the selective engagement of the TERCOM correction algorithm, as in the prior art parallel filter approach. By performing TERCOM processing as a continuously repeated elevation data updating operator, without depending upon a separate decision logic function there is obtained a modified Kalman filter processor which continuously receives both TERCOM and SITAN control information, so that the operation of the SITAN processor is effectively continuously optimized.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one or ordinary skill in the art.

What is claimed:

1. For use with a vehicle guidance system in which data representative of an estimate of the location of said vehicle relative to terrain over which said vehicle is travelling is produced by a navigation system, an arrangement for enhancing the accuracy of said estimate comprising:

first means, responsive to said location estimate representative data, for deriving from a terrain map data base first signals representative of the slope of the terrain at the estimated location of said vehicle and producing, in response thereto, second signals representative of said location estimate;

second means, responsive to said location estimate representative data, for deriving from said terrain map data base third signals representative of the elevation profile of the terrain for successively estimated locations of said vehicle and processing said third signals to produce fourth signals representative of the geographic position of said vehicle with respect to said terrain and an estimate of the error in said fourth signals; and third means for coupling said fourth signals to said first means on an effectively continuous basis and causing said first means to produce said second signals in response to said first and fourth signals.

2. An arrangement according to claim 1, wherein said data representative of the location of said vehicle includes data representative of the altitude and travel path of said vehicle in the course of movement of said vehicle over said terrain, and wherein said second means includes means for correlating said elevation profile representative third signals with fifth signals representative of the effective height of said vehicle above said terrain.

3. An arrangement according to claim 2, wherein said second means further includes means for deriving from the correlation of said third signals with said fifth signals a respective performance index associated with each of a plurality of travel paths traversing said terrain map and being parallel to the effective travel path represented by the data produced by said navigation system and selecting one of said travel paths for producing said fourth signals in accordance with a prescribed relatioship among the derived performance indices.

4. An arrangement according to claim 3, wherein the performance index derived by said second means is defined in accordance with a prescribed differential relationship between said third and fifth signals.

5. An arrangement according to claim 3, wherein the performance index derived by said second means is defined in accordance with a prescribed maximization of said correlation.

6. An arrangement according to claim 3, wherein the performance index derived by said means is defined in accordance with a minimization of a prescribed error function.

7. An arrangement according to claim 2, wherein said first means comprises a Kalman filter signal processor.

8. An arrangement according to claim 7, wherein said navigation system comprises a dead reckoning navigation system.

9. For use with a vehicle guidance system in which data representative of an estimate of the location of said vehicle relative to terrain over which said vehicle is effectively travelling is produced by a dead reckoning navigation system, an arrangement for enhancing the accuracy of said estimate comprising:

a terrain map data base containing prerecorded data representative of elevations of said terrain for a prescribed geographic area over which said vehicle is effectively travelling;

a SITAN Kalman filter signal processor, coupled to said terrain map data base and to said dead reckoning navigation system, which derives from said terrain map data base data representative of the slope of said terrain for successively estimated locations of said vehicle during the effective travel of said vehicle over said terrain as produced by said dead reckoning navigation system and generates vehicle location correction signals in response thereto, for updating the accuracy of the location representative data produced by said dead reckoning navigation system; and a TERCOM signal processor, coupled to said terrain map data base, to said SITAN Kalman filter signal processor, and coupled to receive data representative of the height of said vehicle above said terrain, for effectively continuously supplying position fix representative data to said SITAN Kalman filter signal processor in accordance with terrain contour matching signal processing of said height representative data with elevation profile representative data accessed from said terrain map data base in accordance with the vehicle location representative data produced by said dead reckoning navigation system.

10. An arrangement according to claim 9, wherein said TERCOM signal processor includes means for executing said terrain contour matching signal processing by correlating said height representative data with said elevation profile representative data for a plurality of travel paths traversing said terrain and being parallel to the effective travel path represented by the vehicle location data produced by said dead reckoning navigation system and producing therefrom respective performance indices representative of the correlations.

11. An arrangement according to claim 10, wherein said TERCOM signal processor includes means for generating said position fix representative data and an estimate of the accuracy thereof in accordance with a prescribed relationship to the performance index.

12. An arrangement according to claim 11, wherein said each performance index is defined in accordance with a prescribed maximization of the correlation.

13. An arrangement according to claim 11, wherein each performance index is defined in accordance with a minimization of a prescribed error function.

14. For use with a vehicle guidance system in which data representative of an estimate of the location of said vehicle relative to terrain over which said vehicle is travelling is produced by a navigation system, a method for enhancing the accuracy of said estimate comprising the steps of:
  (a) deriving from a terrain map data base, in response to said location estimate representative data, first signals representative of the slope of the terrain at the estimated location of said vehicle and producing, in response thereto, second signals representative of said location estimate;
  (b) in response to said location estimate representative data, deriving, from terrain map data base, third signals representative of the elevation profile of the terrain for successively estimated locations of said vehicle and processing said third signals to produce fourth signals representative of the geographic position of said vehicle with respect to said terrain and an estimate of the error in said fourth signals; and
  (c) causing step (a) to produce said second signals in accordance with said first and fourth signals on an effectively continuous basis.

15. A method according to claim 14, wherein said data representative of the location of said vehicle includes data representative of the altitude and travel path of said vehicle in the course of movement of said vehicle over said terrain, and wherein step (b) includes the step of correlating said elevation profile representative third signals with fifth signals representative of the effective height of said vehicle above said terrain.

16. A method according to claim 15, wherein step (b) further includes the step of deriving, from the correlation of said third signals with said fifth signals, a respective performance index associated with each of a plurality of travel paths traversing said terrain map and being parallel to the effective travel path represented by the data produced by said navigation system, and selecting one of said travel paths for producing said fourth signals in accordance with a prescribed relationship among the derived performance indices.

17. A method according to claim 16, wherein the performance index derived by step (b) is defined in accordance with a prescribed differential relationship between said third and fifth signals.

18. A method according to claim 16, wherein the performance index derived by step (b) is defined in accordance with a prescribed maximization of said correlation.

19. A method according to claim 16, wherein the performance index derived by step (b) is defined in accordance with a minimization of a prescribed error function.

20. For use with a vehicle guidance system in which data representative of an estimate of the location of a vehicle relative to terrain over which said vehicle is effectively travelling is produced by a dead reckoning navigation system, said guidance system further including a terrain map data base containing prerecorded data representative of elevations of said terrain for a prescribed geographic area over which said vehicle is effectively travelling, a SITAN Kalman filter signal processor, coupled to said terrain map data base and to said dead reckoning navigation system, which derives from said terrain map data base data representative of the slope of said terrain for successively estimated locations of said vehicle during the effective travel of said vehicle over said terrain as produced by said dead reckoning navigation system and generates vehicle location correction signals in response thereto, for updating the accuracy of the location representative data produced by said dead reckoning navigation system, and a TERCOM signal processor, coupled to said terrain map data base, to said SITAN Kalman filter signal processor, and coupled to receive data representative of the height of said vehicle above said terrain, for effectively continuously supplying position fix representative data to said SITAN Kalman filter signal processor in accordance with terrain contour matching signal processing of said height representative data with elevation profile representative data accessed from said terrain map data base in accordance with the vehicle location representative data produced by said dead reckoning navigation system;
  a method of enhancing the accuracy of the vehicle location estimate representative data produced by said dead reckoning navigation system comprising the step of:
  causing said TERCOM signal processor to supply said position fix representative data to said SITAN Kalman filter signal processor in a repeated, effectively continuous manner.

21. A method according to claim 20, wherein said TERCOM signal processor includes means for executing said terrain contour matching signal processing by correlating said height representative data with said elevation profile representative data for a plurality of travel paths traversing said terrain and being parallel to the effective travel path represented by the vehicle location data produced by said dead reckoning navigation system and producing therefrom respective performance indices representative of the correlations.

22. A method according to claim 21, wherein said TERCOM signal processor generates said position fix representative data and an estimate of the accuracy thereof in accordance with a prescribed relationship to the performance index.

23. A method according to claim 22, wherein each performance index is defined in accordance with a prescribed maximization of the correlation.

24. A method according to claim 22, wherein each performance index is defined in accordance with a minimization of a prescribed error function.

* * * * *